(12) United States Patent
Geockner et al.

(10) Patent No.: US 8,692,165 B2
(45) Date of Patent: Apr. 8, 2014

(54) POWER CIRCUITRY INCORPORATING BOTH FOREIGN AND DOMESTIC ALTERNATING CURRENT LINE VOLTAGES FOR A HEATED BEVERAGE APPARATUS

(75) Inventors: Victor D. Geockner, Auburn, IL (US); Kevin G. Lowe, Virden, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 0 days.

(21) Appl. No.: 10/541,338

(22) PCT Filed: Jan. 6, 2004

(86) PCT No.: PCT/US2004/000337
§ 371 (c)(1),
(2), (4) Date: Dec. 7, 2005

(87) PCT Pub. No.: WO2004/062443
PCT Pub. Date: Jul. 29, 2004

(65) Prior Publication Data
US 2006/0169687 A1 Aug. 3, 2006

Related U.S. Application Data

(60) Provisional application No. 60/438,110, filed on Jan. 6, 2003.

(51) Int. Cl.
*H05B 1/02* (2006.01)
*A47J 31/00* (2006.01)
(52) U.S. Cl.
CPC ... *H05B 1/02* (2013.01); *A47J 31/00* (2013.01)
USPC .............. 219/482; 219/490; 219/501; 99/279
(58) Field of Classification Search
CPC ............ H05B 1/02; A47J 31/00; A47J 31/10; A47J 31/34; A47J 31/42
USPC ............. 392/311–316; 99/279–283; 219/501, 219/482, 490; 363/143, 142; 307/43, 52
See application file for complete search history.

(56) References Cited

U.S. PATENT DOCUMENTS 3,021,685 A    2/1962   Gore et al.
3,869,968 A *  3/1975   Ihlenfeld ........................ 99/280
(Continued)

FOREIGN PATENT DOCUMENTS

EP    0509602 A1    10/1992
JP    05341692 A *  12/1993
(Continued)

OTHER PUBLICATIONS

International Search Report for International Application PCT/US2004/000337, International Filing Date Jan. 6, 2004. Date completed Feb. 2, 2005.

(Continued)

*Primary Examiner* — Brian Jennison
(74) *Attorney, Agent, or Firm* — Barnes & Thornburg LLP

(57) ABSTRACT

A beverage apparatus is provided for heating a liquid and is operable either by foreign or domestic voltages. The apparatus may have a heating element that couples directly to the voltage source, regardless of whether the voltage source is foreign or domestic. The apparatus also may have a power supply that couples directly to the voltage source, regardless of whether the voltage source is foreign or domestic. The power supply outputs a DC voltage that may be coupled to various other components of the apparatus either directly or after subsequent processing.

27 Claims, 11 Drawing Sheets

(56) References Cited

U.S. PATENT DOCUMENTS

| | | | |
|---|---|---|---|
| 3,987,717 A * | 10/1976 | Bergmann et al. | 99/280 |
| 4,211,342 A | 7/1980 | Jamgochian et al. | |
| 4,665,292 A | 5/1987 | Payne | |
| 4,731,519 A | 3/1988 | Dieterle et al. | |
| 4,886,955 A * | 12/1989 | Kimura | 219/494 |
| 4,937,600 A * | 6/1990 | Hirabayashi et al. | 347/156 |
| 5,144,364 A * | 9/1992 | Ichikawa | 355/69 |
| 5,375,508 A * | 12/1994 | Knepler et al. | 99/280 |
| 5,862,738 A * | 1/1999 | Warne | 99/281 |
| 5,886,892 A * | 3/1999 | Radley et al. | 363/126 |
| 6,100,518 A * | 8/2000 | Miller | 250/222.1 |
| 6,130,990 A * | 10/2000 | Herrick et al. | 392/321 |
| 6,312,589 B1 * | 11/2001 | Jarocki et al. | 210/87 |
| 6,522,834 B1 | 2/2003 | Herrick et al. | |
| 2001/0048958 A1 * | 12/2001 | Funk | 426/231 |
| 2002/0130137 A1 * | 9/2002 | Greenwald et al. | 222/54 |
| 2003/0085621 A1 * | 5/2003 | Potega | 307/18 |
| 2004/0163546 A1 * | 8/2004 | Suggi Liverani et al. | 99/279 |

FOREIGN PATENT DOCUMENTS

| | | | |
|---|---|---|---|
| JP | 2000106262 A | * | 4/2000 |
| WO | WO 0011914 A1 | * | 3/2000 |

OTHER PUBLICATIONS

Supplemental Search Report issued in EP04700398 (2009).

* cited by examiner

POWER CIRCUITRY INCORPORATING BOTH FOREIGN AND DOMESTIC ALTERNATING CURRENT LINE VOLTAGES FOR A HEATED BEVERAGE APPARATUS

RELATED APPLICATIONS

This Application is a U.S. Nationalization of PCT Application No. PCT/US04/000337, filed Jan. 6, 2004, which claims priority to U.S. Provisional Patent Application 60/438,110 filed Jan. 6, 2003. The prior applications are expressly incorporated herein by reference in their entirety.

BACKGROUND

The present disclosure relates to a beverage apparatus, and particularly, to power circuitry for a beverage apparatus. More particularly, the present disclosure relates to power circuitry for a beverage apparatus that may be used with different types of external supply voltages, such as domestic supply voltages and foreign supply voltages.

Devices with heating elements that may be coupled to domestic supply voltages and to foreign supply voltages are known. See, for example, U.S. Pat. No. 4,731,519 which discloses a curling iron having two separate heating elements, one of which is used when the curling iron is plugged into a 120 VAC source (i.e. a standard U.S. voltage source) and both of which are used when the curling iron is plugged into a 240 VAC voltage source. See, also, U.S. Pat. No. 5,862,738 which discloses a coffee maker that is usable with different voltage sources, such as 115 VAC and 230 VAC, but that has two different heating elements, only one of which is installed at a time depending upon which voltage source is to be used.

SUMMARY

According to the present disclosure, an apparatus is provided for heating a liquid and is operable by a wide variety of voltages, such as foreign voltages and domestic voltages. The apparatus has one or more of the following features or combinations thereof. The apparatus may have a single heating element that couples directly to the voltage source, regardless of whether the voltage source is foreign or domestic. The apparatus may have a power supply that couples directly to the voltage source, regardless of whether the voltage source is foreign or domestic. A controller may be coupled to an output of the power supply. The controller may be coupled to the heating element to control the operation of the heating element. The power supply may output a regulated DC voltage to operate the controller. The regulated DC voltage may be, for example, 24 VDC. By way of example and not limitation, power output by the power supply may be coupled, either directly or after subsequent processing, to one or more of the following: a solenoid, a valve, a solenoid valve, a pump, a fan, a cooling cabinet, a motor, a sensor, a display, a light, a switch, or an alarm as well as other devices. The sensor may comprise a temperature sensor, a conductance sensor, or an r.p.m. sensor. The temperature sensor may comprise a thermistor. The switch may comprise a user input switch, a limit switch, a triac or a relay. The alarm may comprise an audible alarm or a visual alarm. The display may comprise a screen or an LED. A method for providing power to a beverage apparatus is also disclosed.

Additional features of the invention will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures, in which.

DETAILED DESCRIPTION

Figure 1:
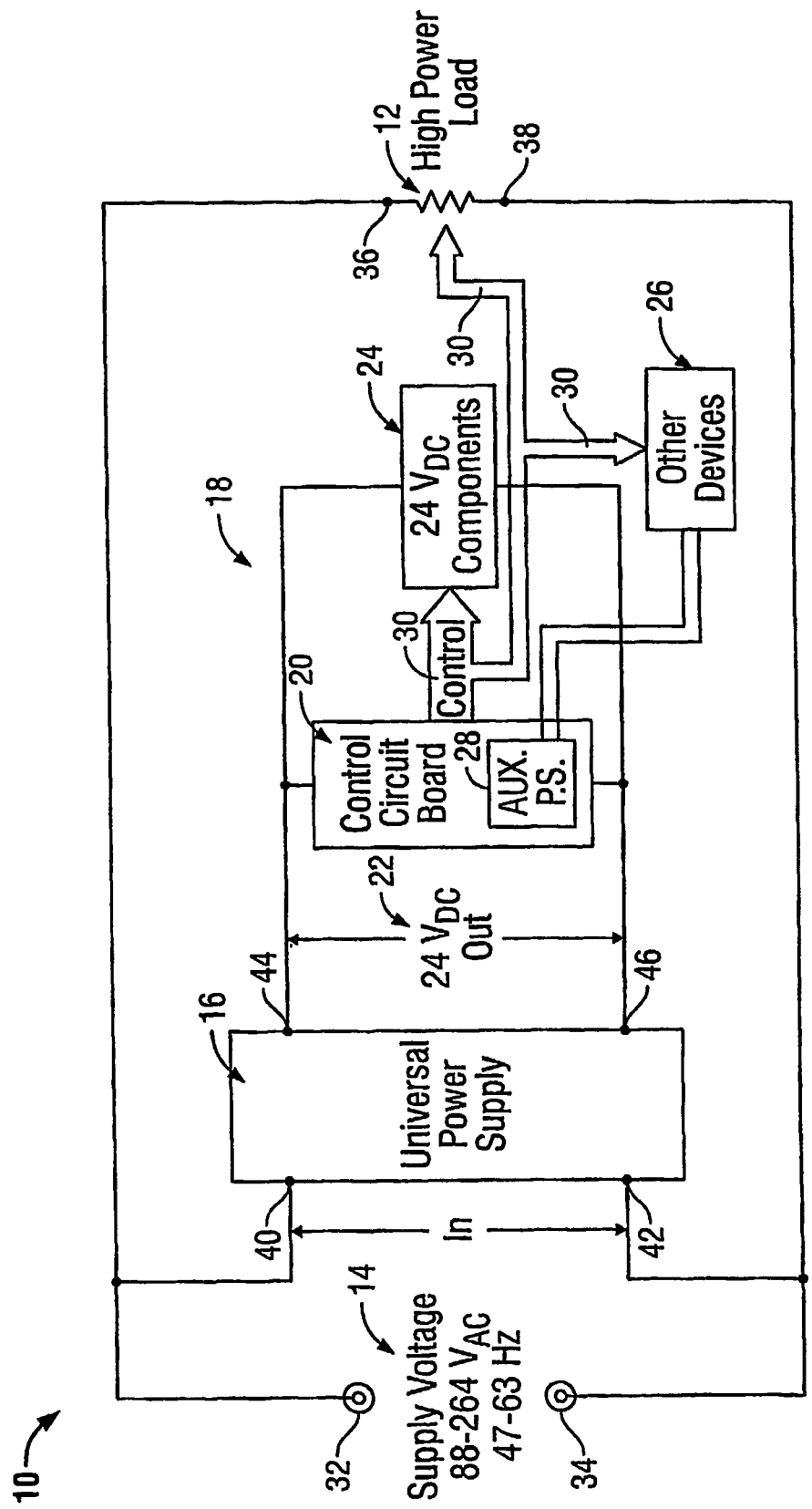
FIG. 1 is a block diagram showing an example of one embodiment of an apparatus in accordance with this disclosure having a high power load coupled directly to a supply voltage which may be in the range of 88 to 264 VAC, a universal power supply coupled directly to the supply voltage, and the universal power supply having a 24 VDC output that is coupled to other circuitry and components of the apparatus.
Figure 2:
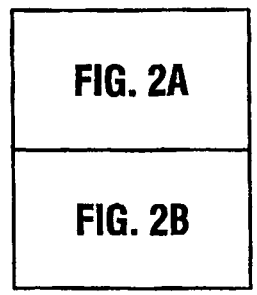
FIG. 2 is a map indicating how to lay out FIGS. 2A and 2B to create a single electric circuit schematic of a beverage heating apparatus in accordance with this disclosure.

An apparatus 10 in accordance with this disclosure comprises a high power load 12, such as a heating element of a beverage heating apparatus that receives power directly from a supply voltage 14 regardless of whether supply voltage 14 is a domestic (alternating current) AC voltage or a foreign AC voltage. Domestic—and foreign AC voltages may be standard voltages available from wall outlets, for example. Supply voltages may vary throughout the world and apparatus 10 is configured for use with virtually all power sources available throughout the world. Other foreign and domestic AC voltages that are not standard may be used to power apparatus 10 as well. Apparatus 10 also has a universal power supply 16 that couples directly to supply voltage 14, regardless of whether supply voltage 14 is a domestic AC voltage or a foreign AC voltage. In the illustrative embodiment, provided as an example but not as a limitation, supply voltages in the range of about 88 Volts AC (VAC) to about 264 VAC and having frequencies of about 47 Hertz (HZ) to about 63 Hz may be used to supply power to load 12 and to power supply 16. In alternative embodiments, a high power load and a power supply are able to receive power that varies over other voltage ranges and other frequency ranges.

Apparatus 10 has a controller 18 that operates to control the application of power from supply voltage 14 to load 12. Controller 18 includes a circuit board 20 having various electrical components (not shown), such as a microprocessor or microcontroller or other logic-based processor or circuitry, that receive regulated direct current (DC) power from power supply 16. The terms processor, microprocessor, microcontroller, logic-based processor, and logic-based circuitry are to be broadly interpreted used interchangeably herein. In the illustrative embodiment, an output 22 of power supply 16 is about 24 volts DC (VDC). Power supply 16 may be, for example, a model no. S-240-24 switching power supply available from Mean Well Central. Other types of universal power supplies, including those having DC outputs of other voltage values, such as 5 VDC, 12 VDC, 30 VDC, or any other DC voltage value, may be used in apparatus 10 in accordance with this disclosure.

Illustrative controller 18 is coupled to a set of 24 VDC components 24 and a set of other devices 26. Components 24 and devices 26 may include, by way of example but not limitation, solenoids, pumps, motors, solenoid valves, valves, sensors, displays, lighting, switches, and the like. In some embodiments, circuit board 20 has an auxiliary power supply 28 that converts the voltage output from power supply 16 to some other value, such as for example 5 VDC, which is then used to power the other devices 26. Thus, components 24 are operated by 24 VDC, whereas devices 26 are operated by some other voltage. As indicated diagrammatically in FIG. 1 by a series of arrows 30, controller 18 sends control signals to control the operation of load 12, components 24, and devices 26. For example, controller 18 may provide an on/off and/or proportional control of load 12. In such embodiments having on/off control or proportional control of the application of power to load 12, load 12 is still considered to be coupled "directly" to the supply voltage (foreign or domestic), in accordance with this disclosure, despite the fact that a switch or similar circuit-breaking component is operable in a mode in which current is prevented from flowing to load 12.

In the illustrative embodiment of apparatus 10 shown in FIG. 1, load 12 and power supply 16 are coupled to supply voltage 14 in parallel. Apparatus 10 has a first lead 32 and a second lead 34, such as prongs of a plug that couple to a standard wall outlet from which supply voltage 14 is available. Leads 32, 34 are coupled via suitable conductors to a first terminal 36 and a second terminal 38, respectively, of load 12. In addition, leads 32, 34 are coupled via suitable conductors to input terminals 40, 42, respectively, of power supply 16. In addition, circuit board 20 of controller 18 and components 24 are coupled to output 22 of power supply 16 in parallel. Thus, output terminals 44, 46 of power supply 16 are coupled via suitable conductors to controller 18 and to components 24.

Figure 2A:
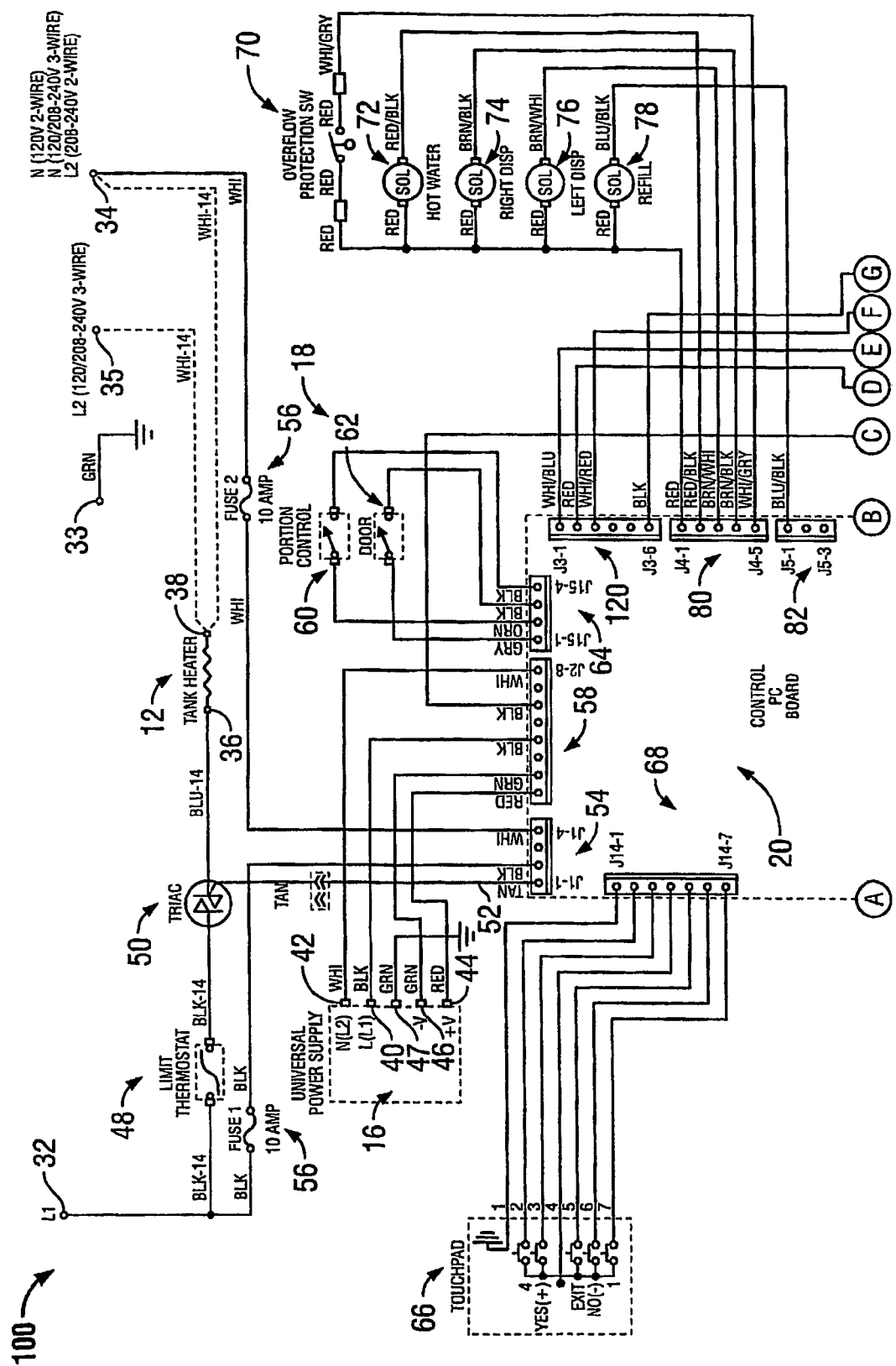
Figure 2B:
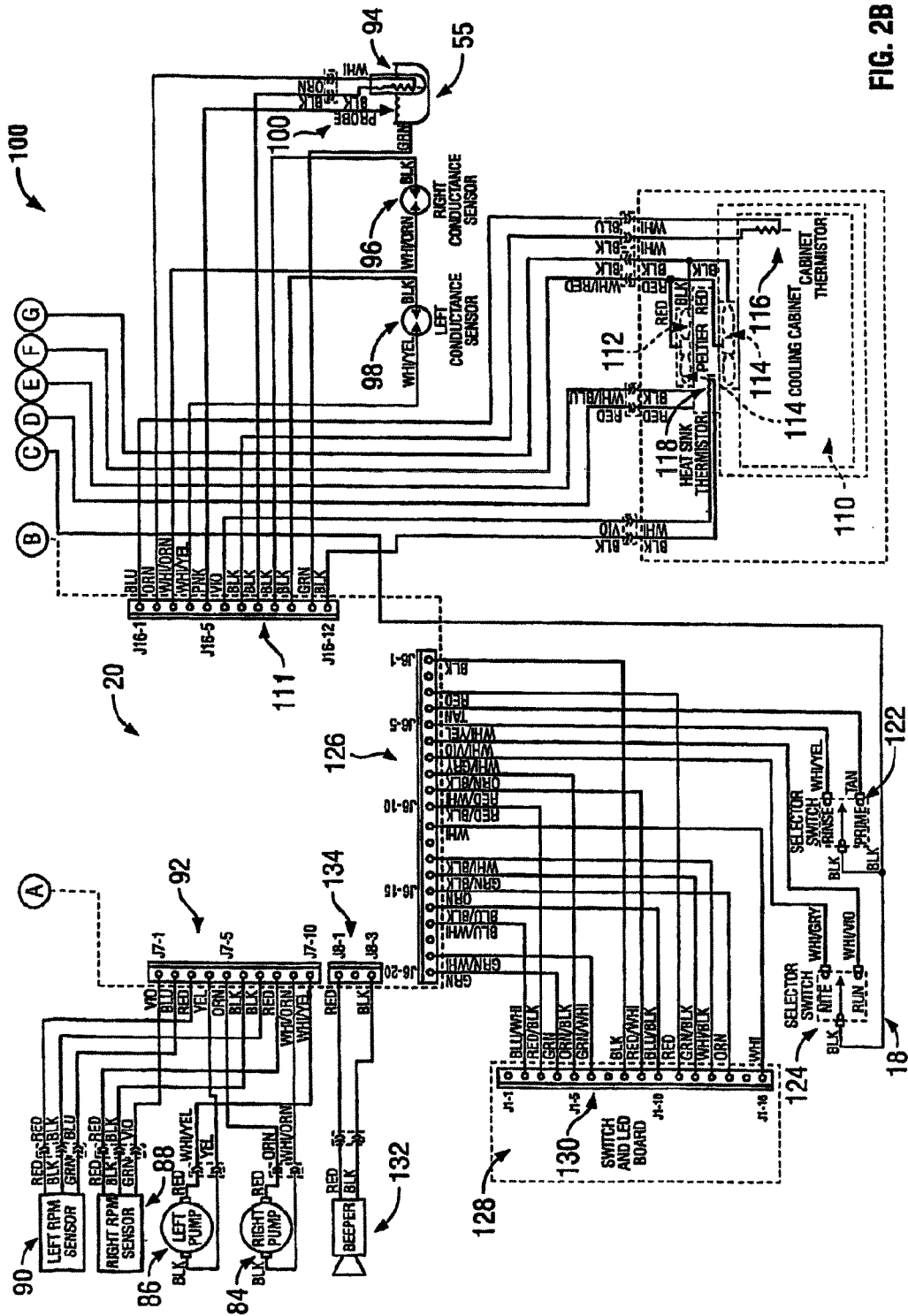
Figure 3A:
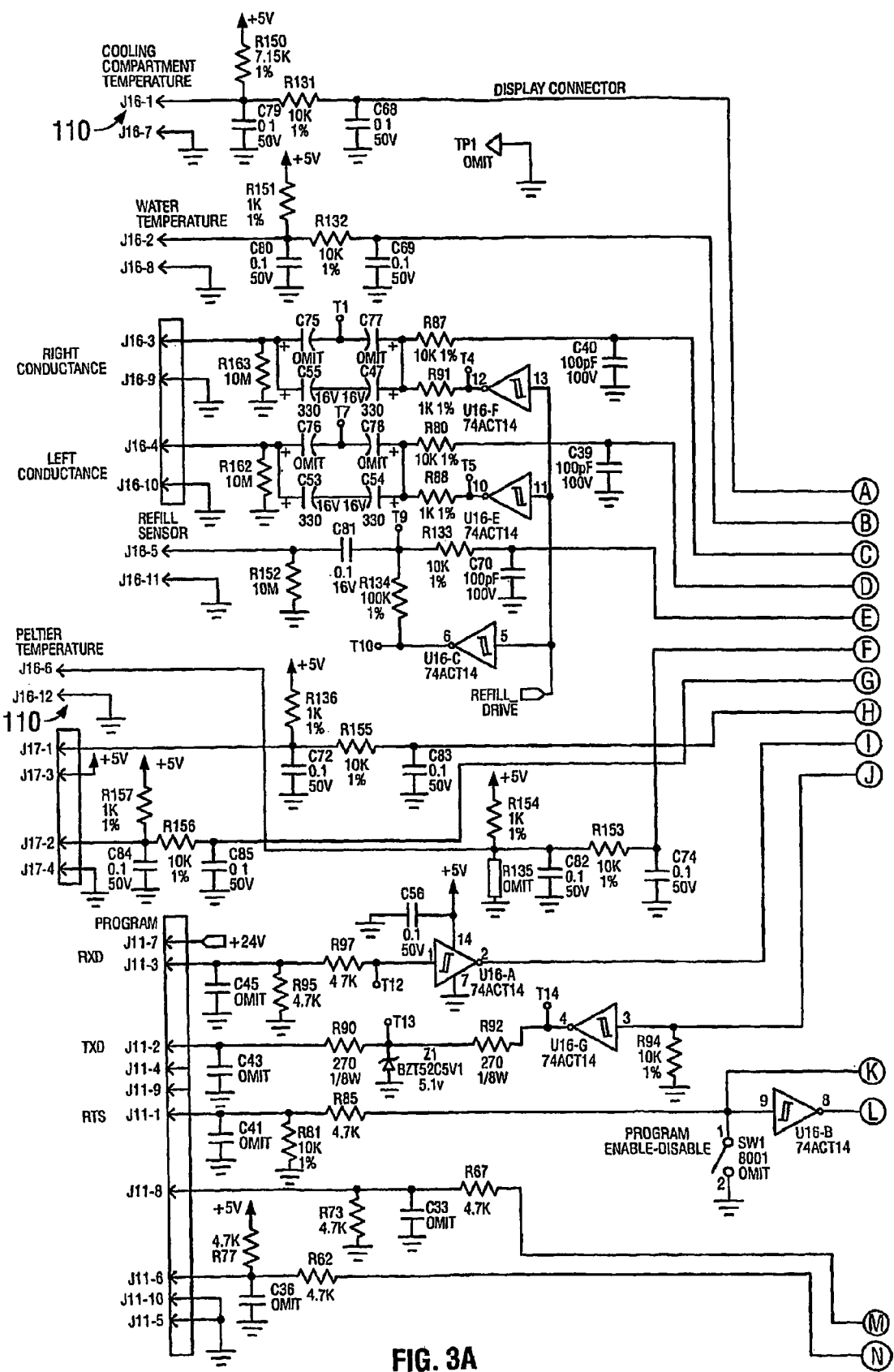
Figure 3B:
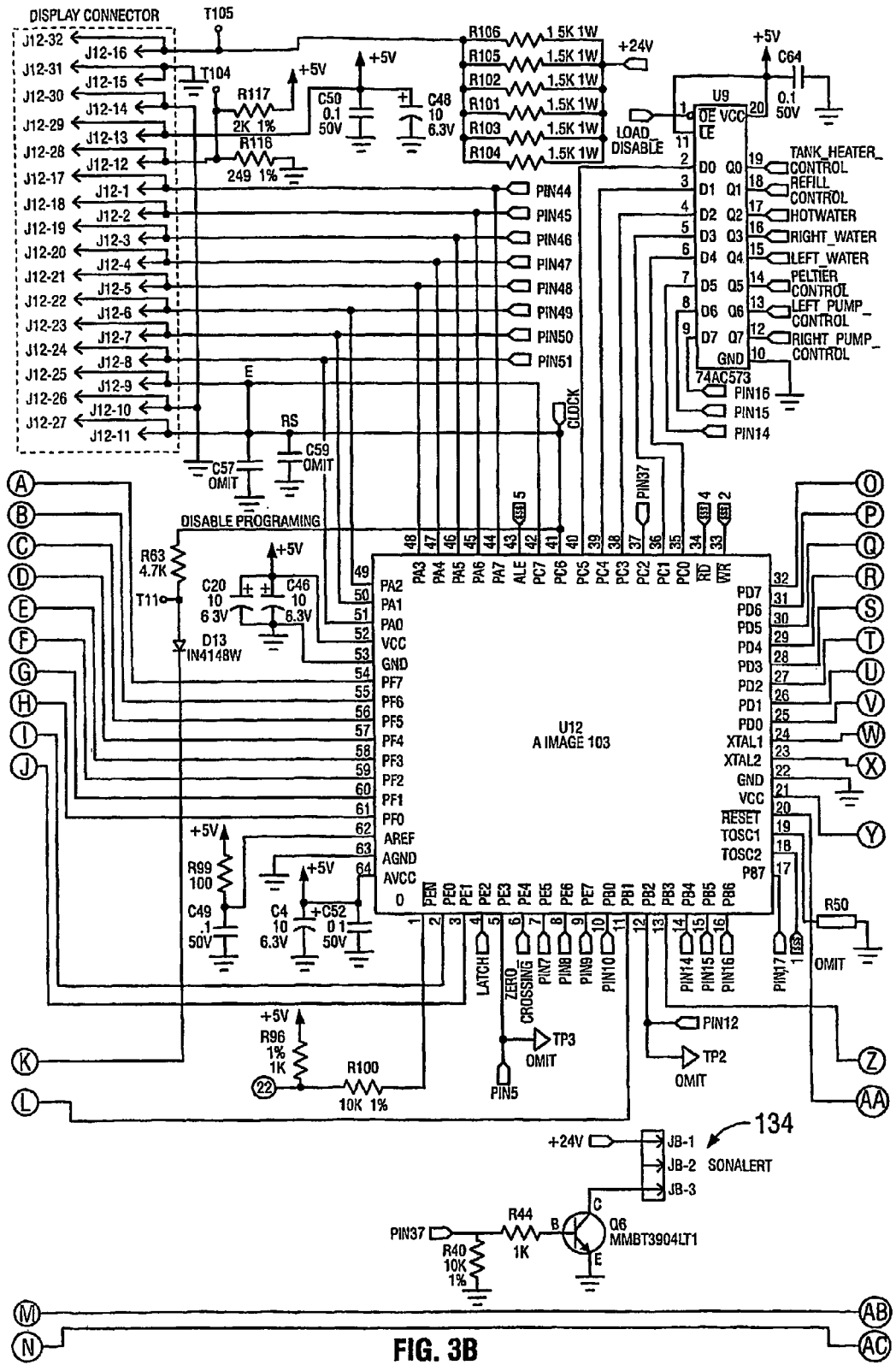
Figure 3C:
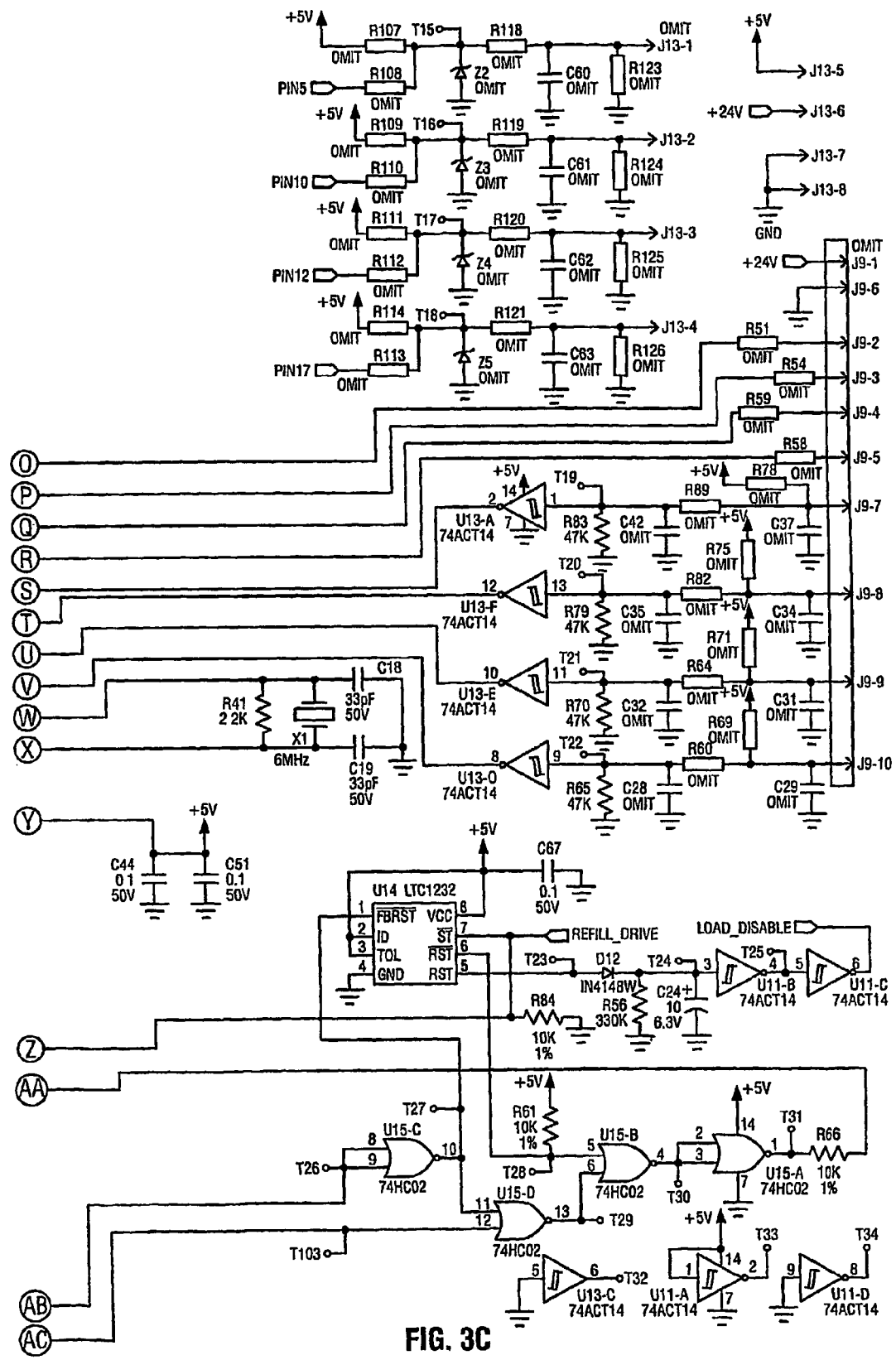
Figure 4A:
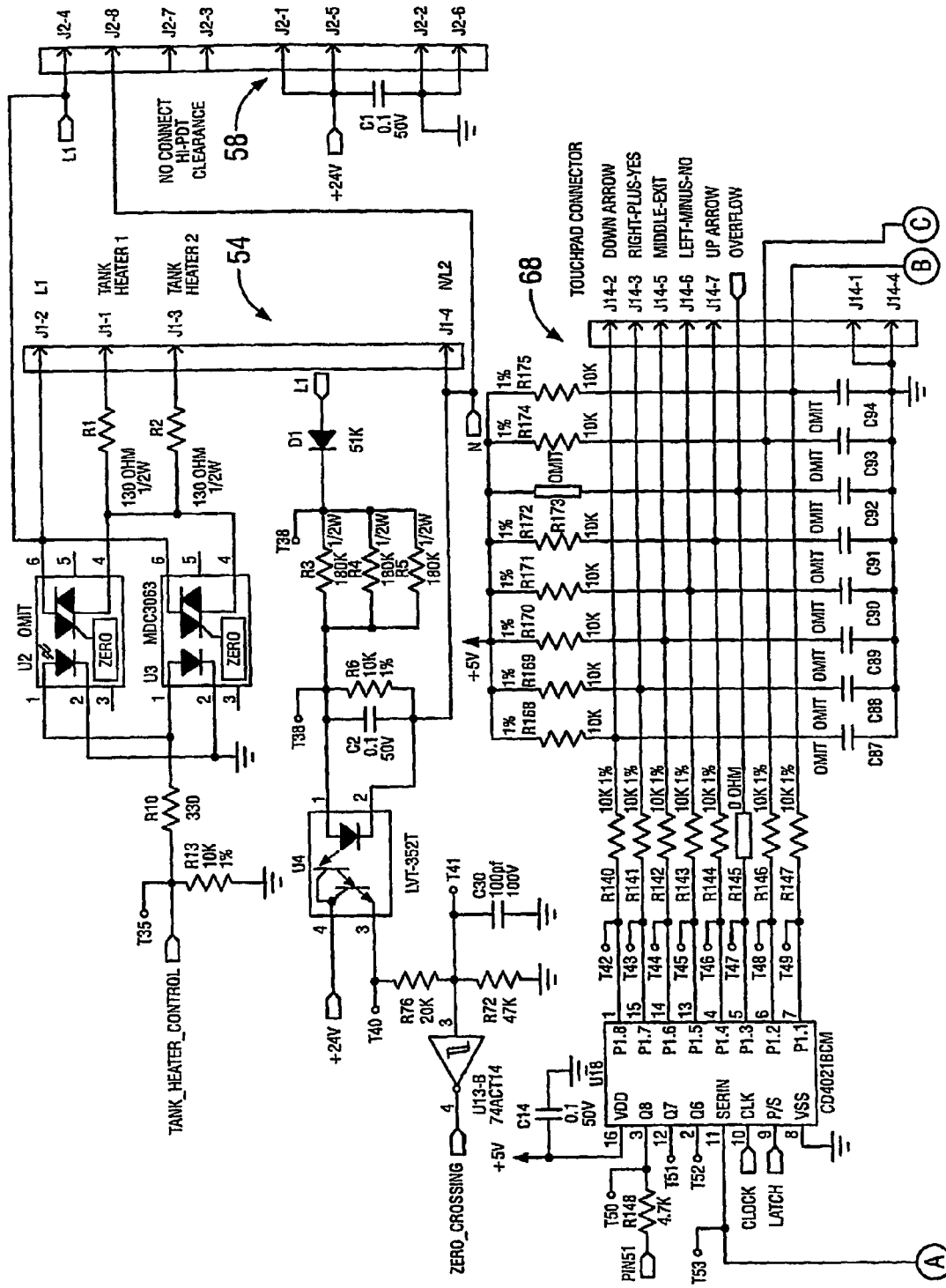
Figure 4B:
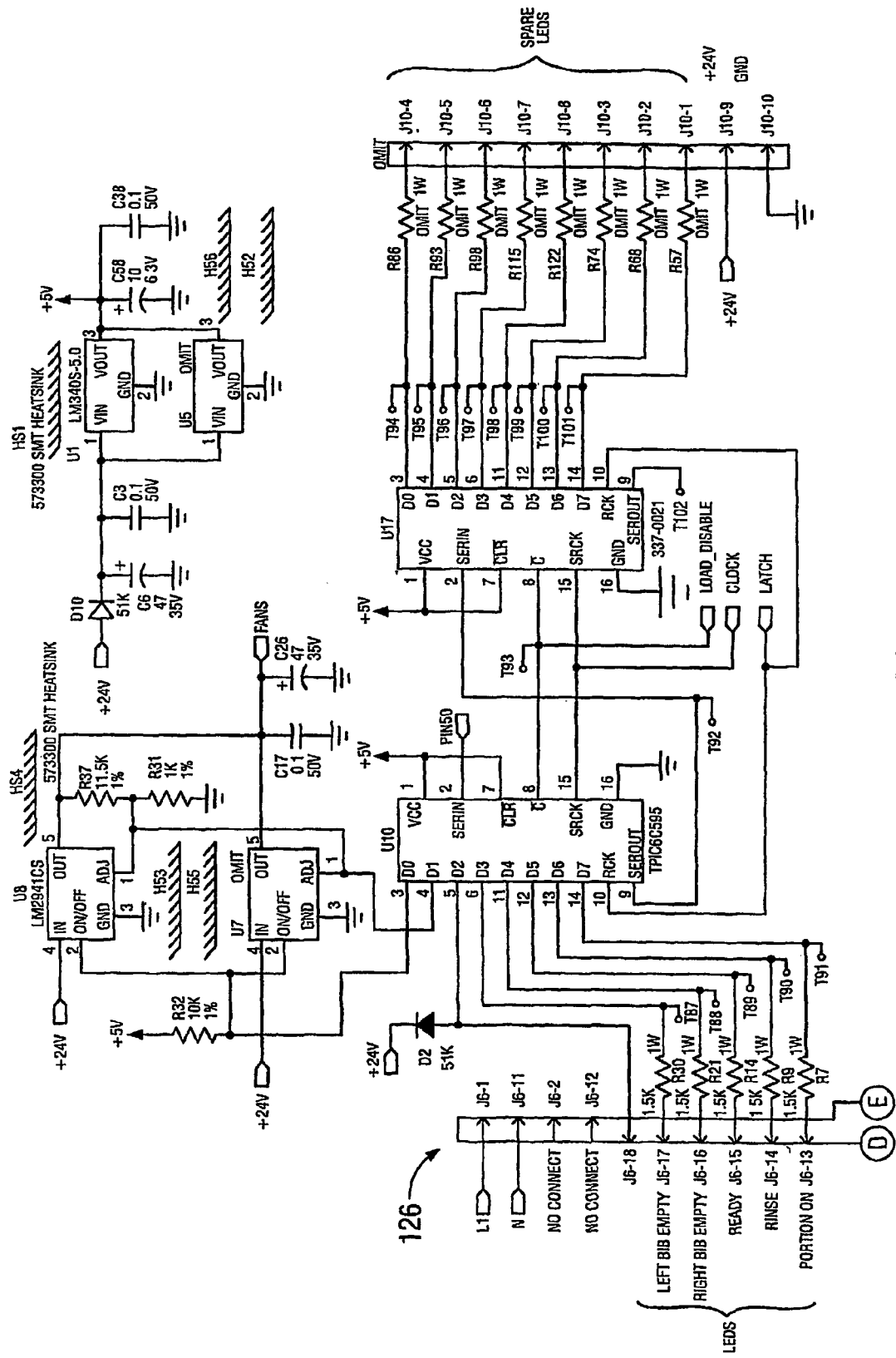
Figure 4C:
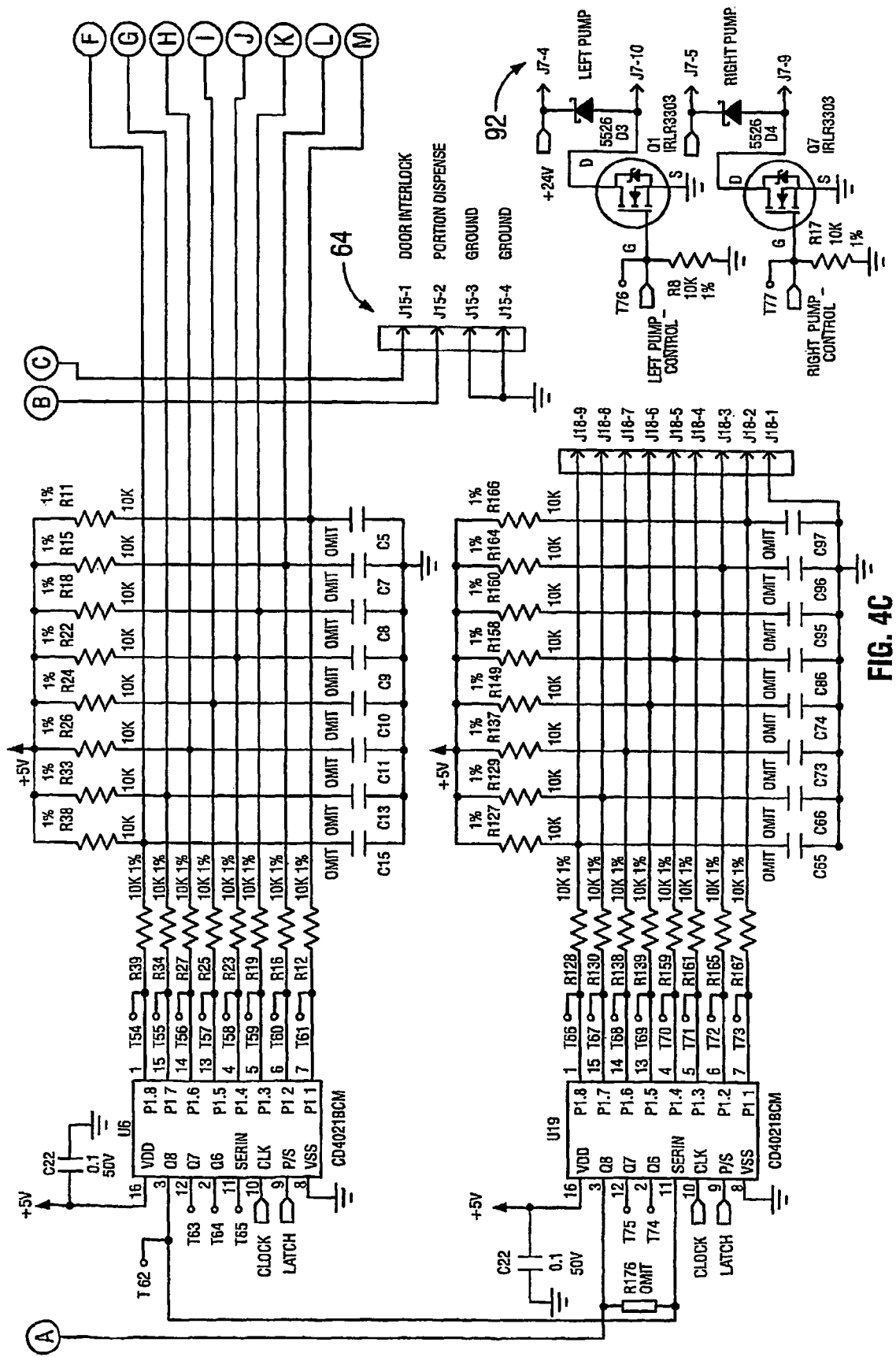
Figure 4D:
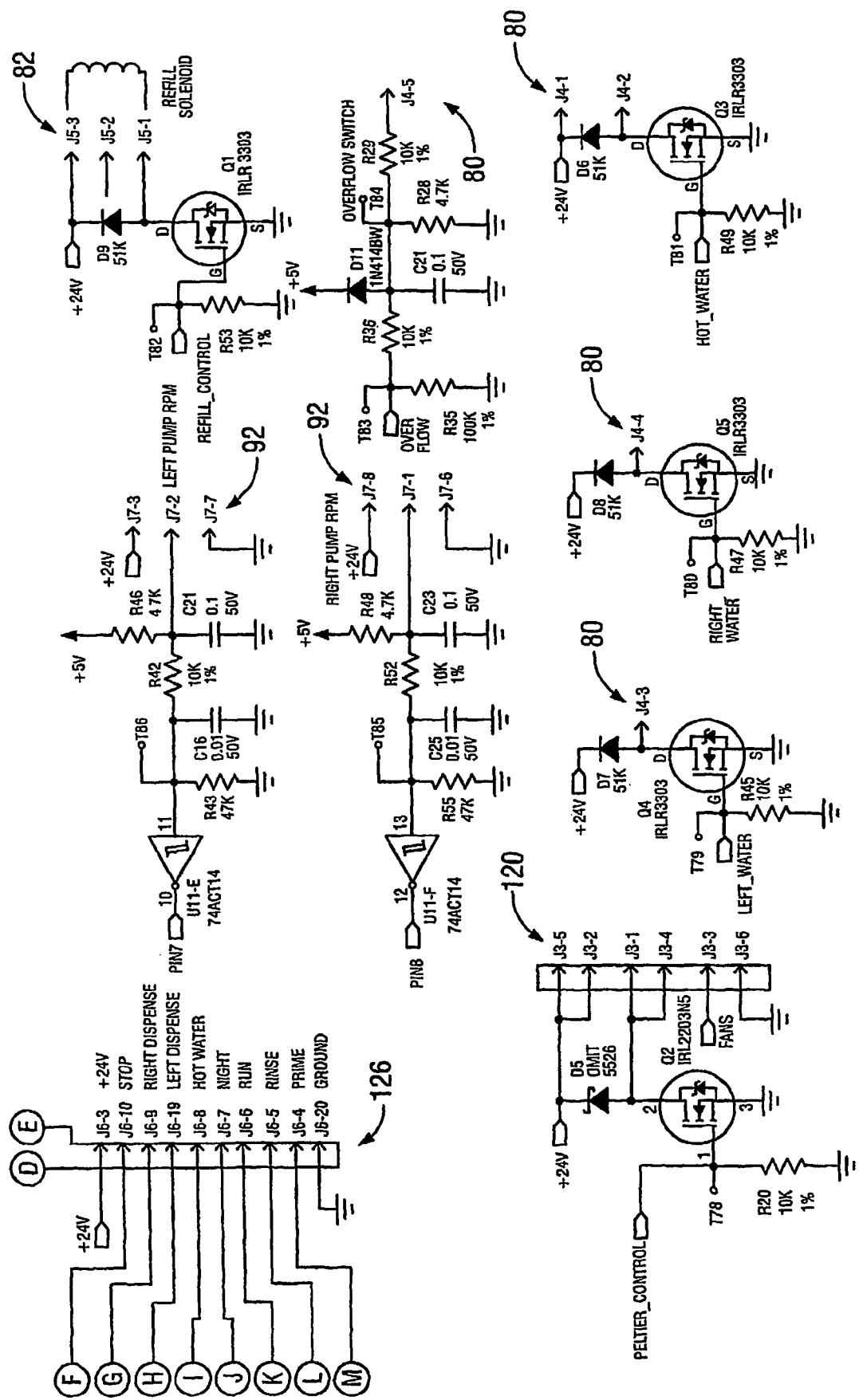

In the description that follows with regard to FIGS. 2A and 2B, certain circuit components, including integrated circuit elements, may be identified, and in some instances, certain terminal names or pin numbers for the illustrative circuit elements, such as connectors, may be identified. This should not be interpreted to mean that the identified circuit components are the only components available that will perform the described functions. Other circuit components are typically available which will perform the described functions. The terminal names and pin numbers of such other circuit components may or may not be the same as those indicated for the specific circuits identified in this disclosure. In addition, any pin numbers or terminal names given for any connectors of board 20, are provided for illustrative purposes only, and it should be understood that circuit components may be coupled together through other pins and through other connectors without exceeding the scope of this disclosure.

Referring now to FIGS. 2A and 2B, a schematic of a beverage apparatus 100 in accordance with the present disclosure is provided. Components of apparatus 100 that are substantially similar to like components of apparatus 10 are denoted with like reference numerals. Lead 32 of apparatus 100 is coupled to terminal 36 of a heating element or tank heater (hereinafter referred to as heater 12 or heating element 12) through a series combination of a fuse or limit thermostat 48 and a triac 50 as shown in FIG. 2A. In alternative embodiments, triac 50 is replaced with some other type of switch, such as, for example, a relay switch. In some embodiments, a plug of apparatus 100 has a ground lead 33 and/or an alternative second lead 35.

A control line 52 extends from pin 1 of a connector 54 of circuit board 20 to triac 50. On/off signals are communicated to triac 50 via line 52 from the microprocessor of controller 18. When leads 32, 34 are coupled to the supply voltage, power is applied to heating element 12 when triac 50 is turned on and power is decoupled from heating element 12 when triac 50 is turned off. As mentioned above, the supply voltage is considered to be coupled directly to heating element 12 even though triac 50 switches on and off to control the amount of heat generated by heating element 12. Leads 32, 34 of apparatus 100 are coupled to pins 2 and 4, respectively, of connector 54 through respective 10 Amp fuses 56. Heater 12 heats liquid, such as water, that is situated in a tank or container 55, which is shown diagrammatically in FIG. 2B.

In some embodiments, a second heater (like heater 12) is provided to heat a second tank or container of liquid. In such embodiments having a second heater, a series combination of the second heater, a second limit thermostat, and a second triac is coupled between leads 32, 34 in parallel with the series combination of heater 12, limit thermostat 48, and triac 50. Also in such embodiments, the second triac associated with the second heater receives a control signal via a line extending from pin 3 of connector 54. In other alternative embodiments, multiple thermostats, such as a double pole limit thermostat and/or a switch and thermostat combination are provided in series with heater 12 and triac 50 between leads 32, 34 in lieu of thermostat 48. In some alternative embodiments, an RFI suppression capacitor is coupled to leads 32, 34 in parallel with the series combination of heater 12 and associated thermostats and triacs.

Pin 1 of connector 54 is coupled via a conductor to pin 4 of a connector 58, which is, in turn, coupled to terminal 40 of power supply 16. Pin 4 of connector 54 is coupled via a conductor to pin 8 of connector 58, which is, in turn, coupled to terminal 42 of power supply 16. Terminals 44, 46 of power supply 16 are coupled to pins 1 and 2, respectively, of connector 58 as shown in FIG. 2A. Power supply has a ground terminal 47 which is coupled to ground. Thus, a 24 VDC potential is provided by power supply between pins 1 and 2 of connector 58. This 24 VDC potential is coupled to various other circuit components carried by board 20 or to other components of apparatus 100 which connect to board 20 as discussed in further detail below.

Controller 18 includes a portion control switch 60 and a door switch 62, each of which is coupled to a connector 64 via associated conductors as shown in FIG. 2A. Portion control switch 60 is pressed manually to signal the microprocessor of controller 18 to enter into a portion control mode that allows programming of the amount of heated beverage to be dispensed. Door switch 62 senses whether a main door of beverage heating apparatus 100 is open and, if so, prevents the dispensing of the heated beverage. Controller 18 also includes a touchpad 66 which illustratively has a set of momentary switches including a down-arrow switch, a YES (+) switch, an EXIT switch, a NO (−) switch, and an up-arrow switch. In some embodiments, these switches comprise membrane switches. The switches of touchpad 66 serve as a user interface for initial programming and set up of machine parameters of apparatus 100. Examples of how the switches of touchpad 66 are used to program apparatus 100 are described in an Installation & Operating Manual for Bunn-O-Matic Corporation's Model Nos. LCA-2 and LCC-2 devices, which is incorporated in its entirety herein by reference. The switches of touchpad 66 are coupled to a connector 68 of board 20 via suitable conductors as shown in FIG. 2A.

Apparatus 100 has an overflow protection switch 70, a hot water solenoid 72, a right dispenser solenoid 74, a left dispenser solenoid 76, and a refill solenoid 78 as shown in FIG. 2A. Switch 70 closes if the container that receives the liquid to be heated becomes overfilled, thereby generating an alarm signal. Hot water solenoid 72 is normally closed, but opens upon an appropriate user signal (such as pressing a button, moving a lever, etc.) to permit heated water to flow from the tank out of a hot water dispenser, such as a spigot, nozzle, tap or tip. Right dispenser solenoid 74 is normally closed, but opens upon an appropriate user signal (such as moving a first dispense handle) to permit a mixture of heated water from the tank and a first type of concentrate from an associated first concentrate container to flow out of a right dispenser, such as a spigot, nozzle, tap or tip. Similarly, left dispenser solenoid 76 is normally closed, but opens upon an appropriate user signal (such as moving a second dispense handle) to permit a mixture of heated water from the tank and a second type of concentrate from an associated second concentrate container to flow out of a left dispenser. The first and second concentrate may be any of a variety of flavored concentrates, such as hot chocolate concentrate, coffee concentrate (of all flavors and types, caffeinated or decaffeinated), tea concentrate, and the like. Reference to concentrate is intended to be broadly interpreted including liquids, powders, gels, syrups, or any other form of concentrate which may be used during the preparation of a beverage or other food products. The concentrates may include other food products in addition to beverages such as soup, gravy, potatoes and other food products which might be produced or reconstituted when combined with water or other liquid. Additionally, the reference to concentrate is not limiting to concentrate but also includes beverage brewing substances such as coffee, tea or other substances which are used in combination with a heated liquid such as water to produce a brewed beverage. Solenoid 78 is normally closed, but opens after the volume of water in the tank drops by a threshold amount so that the tank is refilled with water from a water source, such as a standard water line in a building, for example.

Switch 70 and solenoids 72, 74, 76, 78 are operated by 24 VDC from power supply 16. It is within the scope of this disclosure for solenoids 72, 74, 76, 78 to have integrated valve components (i.e., such that these are considered to be solenoid valves) or to interact with separate valves to open and close associated conduits. In addition, electrically operated valves other than solenoids or solenoid valves, such as, for example, a stepper motor actuated valve, may be included in apparatus 100 in lieu of one or more of solenoids 72, 74, 76, 78. As shown in FIG. 2A, conductors associated with switch 70 and solenoids 72, 74, 76 are coupled to a connector 80 of board 20. One conductor associated with solenoid 78 is coupled to connector 80 and another conductor associated with solenoid 78 is coupled to a connector 82 of board 20.

Apparatus 100 comprises a right pump 84 and a left pump 86 as shown in FIG. 2B. Pumps 84, 86 are operable to move concentrate out of the first and second concentrate containers, respectively, for mixing with the heated water from tank 55 to form the beverage to be dispensed to a user. The speed at which the pumps 84, 86 operate determines the ratio of the mixture of heated water and concentrate that is ultimately dispensed. If the speed at which pumps 84, 86 operate is increased, then more concentrate will be mixed with the heated water per unit volume, for example. Apparatus 100 has a first speed sensor 88 and a second speed sensor 90. Sensors 88, 90 sense the speed, in revolutions per minute (r.p.m.) at which shafts (not shown) of pumps 84, 86 rotate and provide feedback to controller 18 so that speed adjustments to pumps 84, 86 can be made by controller 18, if necessary. Pumps 84, 86 and sensors 88, 90 are coupled via associated conductors to a connector 92 of board 20 as shown in FIG. 2B. Each of pumps 84, 86 and sensors 88, 90 are coupled to the 24 VDC power which is produced by power supply 16.

Apparatus 100 has first and second concentration sensors 96, 98 that sense the amount of concentrate that is mixed with heated water from tank 55 to form the first and second heated beverages, respectively. Concentration sensors 96, 98 are situated in associated fluid mixture conduits or delivery lines downstream of the point at which the first and second concentrates are mixed with the heated water from tank 55. In the illustrative embodiment, sensors 96, 98 comprise conductance sensors which sense the conductivity of the mixture of concentrate and water. However, it is within the scope of this disclosure for any type of concentration sensor to be used. In some embodiments, feedback signals from sensors 96, 98 are used by controller 18 to determine whether speed adjustments to pumps 84, 86 are needed in order to bring the mixture of concentrate and water within programmed concentration limits. In some embodiments, sensors 96, 98 provide a low-concentration signal which indicates that the bibs or containers of concentrate need to be replaced.

It should be noted that other versions of concentrate dispensing units by the pumps 84,86 may be used. For example, in the device which dispenses a powered or granular concentrate the pump 84 may be replaced with a motor driven auger unit or other controllable powder dispensing device. Moreover, the dispensing unit may include speed sensors or other devices for detecting the dispense rate of the powered substance generally analogous to the sensor 88 used with the liquid concentrate. The motors and sensors associated with a powered dispensing device are also coupled to the controller and controllable thereby. Similarly, concentrate sensors 96 may be used with the powder concentrate to detect the amount of concentrate mixed with heated water from the tank to form the beverages. Additional form of sensors that may be used with concentrate dispensers may be optical, conductive or other forms of level sensing devices to detect when the level in a liquid or a power concentrate container has dropped below a desired level. Such sensors are also coupled to the controller.

Apparatus 100 has a temperature sensor 94 that produces a signal indicative of the temperature of the liquid in tank 55. In some embodiments, sensor 94 comprises a thermistor. However, it is within the scope of this disclosure for any type of temperature sensor to be used for measuring the temperature of the liquid in tank 55. Apparatus 100 further comprises a sensor or probe 100 that senses the volume of liquid in tank 55. When the probe 100 senses that the liquid volume has dropped by a certain amount, the controller 18 responds to a low level signal from probe 100 by opening refill solenoid 78 so that the tank 55 is refilled with liquid until probe 100 senses that the liquid volume has increased back to the "full" level of the tank 55, at which point solenoid 78 is closed by controller 18. In those embodiments having a second tank, a second probe like probe 100 is provided for sensing the level of liquid in the second tank. In the illustrative embodiment, therefore, probe 100 is able to sense "low" and "full" levels of liquid in container 55. In alternative embodiments, separate sensors or probes are used to sense low and full levels of liquid, respectively. Sensors 94, 96, 98, 100 are coupled to a connector 111 of board 20 by suitable conductors as shown in FIG. 2B.

In some embodiments, apparatus 100 may include a cooling cabinet 110 for producing chilled liquid, such as in some embodiments, apparatus 100 may include a cooling cabinet 110 producing chilled liquid such as a liquid coffee concentrate or other beverage concentrate which may require cooling to help maintain freshness. While all beverage or other food product concentrates require refrigeration or other temperature reduction to help maintain freshness, some products may benefit from reduced temperature to further extend the shelf life or perhaps enhance the flavor of the resultant beverage or food product. Additionally, a cooling cabinet or cooling device 110 may be used for producing chilled water which might also be used to combine with juice concentrates which has fruit juices, chilled teas, chilled coffees to produce a cool or chilled beverage.

Associated with cooling cabinet 110 is a cooling element 112, such as an illustrative heat sink that relies upon the Peltier effect for cooling. Also associated with cooling cabinet 110 are a pair of fans 114 that direct air across cooling element 112 and into the cabinet 110. The air entering cabinet 110 is cooled by element 112 and chills the liquid that is situated in cabinet 110, either in a separate liquid container or in a conduit that is routed through cabinet 110. The cooling element 112 might also be in the form of a refrigeration system which includes a compressor unit and other refrigeration components. Reference to the cooling element or cooling system 112 is provided by way of example and not limitation and the reference to the cooling cabinet and the cooling element should be broadly interpreted. Devices such as compressors will benefit from the power supply which provides a system voltage and frequency as such devices can be sensitive to variation in voltage and frequency. Compressors are usually matched to a specific type of power configuration based on the voltage and frequency. As such, a variety of specific compressors might be required in a beverage dispenser providing the cooling portion. However, in the present disclosure, use of the universal power supply helps eliminate multiple compressors which might otherwise be necessary to provide the beverage apparatus to different markets and instead allows a single compressor to be matched with the power output from the power supply for use in any of a variety of power environment accommodated by the power supply.

In those embodiments having cooling cabinet 110, a first temperature sensor 116 is provided for sensing the temperature in cooling cabinet 110 and a second temperature sensor 118 is provided for sensing the temperature of cooling element 112. Illustrative temperature sensors 116, 118 comprise thermistors. However, other types of temperature sensors may be used instead of thermistors. Cooling element 112 and fans 114, shown in FIG. 2B, are coupled via suitable conductors to a connector 120, shown in FIG. 2A. Temperature sensors 116, 118 are coupled via suitable conductors to connector 111 as shown in FIG. 2B.

Controller 18 of apparatus 100 has a function selector switch 122, which allows a user to set apparatus 100 into different dispensing modes, and a mode selector switch 124, which allows a user to set apparatus 100 into different operating modes. As shown in FIG. 2B, illustrative switches 122, 124 are each three-position switches. The functions associated with the three positions of switch 122 are Rinse, Prime, and Normal. The modes associated with the three positions of switch 124 are Run, Off, and Night. Switches 122, 124 are coupled via suitable conductors to connector 58, shown in FIG. 2A, and to a connector 126

When switch 122 is in the Rinse position, apparatus 100 dispenses hot water only (assuming water is the liquid being heated in tank 55) in order to flush the associated dispense tip and mixing chamber (i.e., the chamber in which the hot liquid and concentrate are mixed during normal operation). When switch 122 is in the Prime position, apparatus 100 dispenses concentrate only in order to prime the associated concentrate pump. When switch 122 is in the Normal position, apparatus 100 dispenses a mixed product, such as a mixture of concentrate and heated water. When switch 124 is in the Run position, apparatus 100 operates normally. When switch 124 is in the Off position, all functions of apparatus 100, including the tank heater and chiller (in those embodiments having cooling cabinet 110 and associated components) are disabled. When switch 124 is in the Night position, all dispensing is disabled, but the tank heater and chiller (if applicable) are operational.

Apparatus 100 further comprises a switch and LED board 128 which comprises a number of user inputs and a number of LED's that are illuminated to provide information regarding the operation and/or status of apparatus 100. Board 128 has a connector 130 which couples via suitable conductors to connector 126 of board 20 as shown in FIG. 2B. In the illustrative example, the 24 VDC power from power supply 16 is applied to pin 3 of connector 126 and is provided to pin 11 of connector 130 by the respective conductor.

In one embodiment, the switches associated with board 128 include, for example, a stop switch, a hot water switch, a right dispense switch, and a left dispense switch. Actuation of the stop switch by a user stops all dispense function of apparatus 100. Actuation of the hot water switch by a user causes hot water to be dispensed from an associated dispenser tip. Actuation of the right dispense switch by a user causes an associated beverage (i.e., a mixture of water and concentrate) to be dispensed from a right dispenser tip. Similarly, actuation of the left dispense switch by a user causes an associated beverage to be dispensed from a left dispenser tip. Thus, actuation of the various switches on board 128 signals controller 18 to operate solenoids 74, 76, 78 in the appropriate manner to permit or stop, as the case may be, the dispensing of a heated beverage. The term "switch" as used in connection with board 128 includes all types of user inputs, such as buttons, knobs, levers, and the like.

In one embodiment, the LED's associated with board 128 include a power LED, a Ready LED, a Portion LED, a Rinse LED, a first Refill LED, and a second Refill LED. The Power LED is illuminated to indicate that AC power is applied to the dispenser. The Ready LED is illuminated to indicate that the water (or other liquid) in tank 55 is at a temperature suitable for dispensing to a user. The Portion LED is illuminated to indicate that the portion dispense option has been selected. The Rinse LED is illuminated to indicate that an optional preset rinse alarm time has elapsed. The first Refill LED is illuminated to indicate that an associated first concentrate container needs to be replaced. The second Refill LED is illuminated to indicate that a second concentrate container needs to be replaced.

In the illustrative embodiment, apparatus 100 comprises a beeper or audible alarm 132 that is coupled to a connector 134 of board 20 via suitable conductors. Controller 18 activates beeper 132 when certain alarm conditions are present. In some embodiments, controller 18 may activate beeper 132 for other reasons, such as to alert the user that certain programming features have been appropriately stored in memory devices associated with controller 18.

In some embodiments, apparatus 100 has a display screen, such as a liquid crystal display (LCD), that displays programming menus and fault messages. In such embodiments, the display screen may be situated adjacent touchpad 66 which is used to program apparatus 100 as described above. Also in such embodiments, a connector (not shown) is provided on board 20 for coupling to the display screen via suitable conductors. The term "suitable conductors" used herein includes wires and/or conductive traces printed on substrates and/or any other structure capable of serving as an electrical conductor between two circuit elements, as well as combinations of these. It should be noted that conductors are to be broadly considered as communication paths rather physically connected, connected through optical fiber or connected through wireless devices. It is envisioned that while the power supplying connection between the power supply, controller and devices may be physically connected the communication paths between the devices and the controller may be in the form of wireless communication paths.

Figure 3:
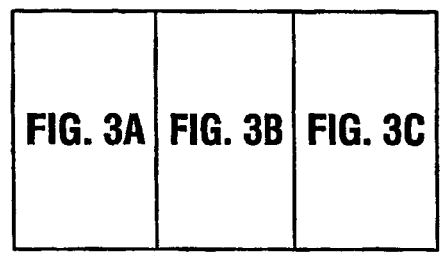
FIGS. 3 and 4 are schematics of circuitry as disclosed.
Figure 4:
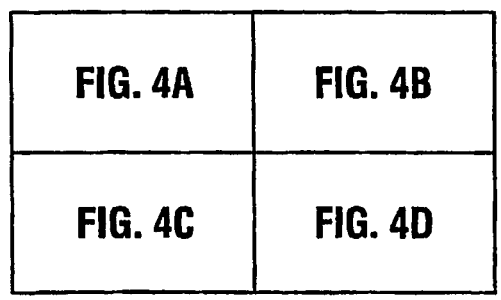

FIGS. 3 and 4 are schematics of the circuits contained on board 20. Where appropriate, the reference numerals associated with connectors 54, 58, 64, 68, 80, 82, 92, 110, 120, 126, 134, shown in FIGS. 2A and 2B, are indicated on FIGS. 3 and 4. The various circuit components, including integrated circuit components, shown in FIGS. 3 and 4 are all standard circuit components and are identified by their chip names (in the case of integrated circuits, including the microcontroller, logic gates, transistors, amplifiers, diodes, shift registers, and the like) or by their particular relevant characteristics (such as resistance in the case of resistors, capacitance in the case of capacitors, and the clock speed in the case of the clock or oscillator). Therefore, a description of the circuits shown in FIGS. 3 and 4 are omitted for the sake of brevity. Furthermore, the circuit of board 128 is omitted altogether as it pertains only to the operation of switches and LED's, which is well known to those skilled in the art.

Although the apparatus and method have been described in detail with reference to certain illustrative embodiments, variations and modifications exist with the scope and spirit of this disclosure as described and defined in the following claims.

The invention claimed is:

1. A method of heating a liquid using an apparatus that is operable by a supply voltage that is either a first AC voltage from a first source or a second AC voltage from a second source, wherein the first source is different from the second source, the method comprising:
   providing a container for retaining a liquid to be heated;
   providing a heating element;
   coupling the heating element directly to the supply voltage regardless of whether the supply voltage is the first AC voltage or the second AC voltage;
   providing a power supply capable of receiving a variety of input voltages;
   coupling an input of the power supply directly to the supply voltage regardless of whether the supply voltage is the first AC voltage or the second AC voltage, wherein the power supply and the heating element are coupled in parallel to the first AC voltage or the second AC voltage;
   providing a DC output from the power supply;
   providing a controller; coupling the controller to the DC output from the power supply;
   providing a switch coupled to the controller and coupled to the heating element, the controller opening and closing the switch to control heating of the liquid in the container, the first AC voltage being applied to the heating element when the switch is closed when the beverage heating apparatus is operated in a first area, and the second AC voltage being applied to the heating element when the switch is closed when the beverage heating apparatus is operated in a second area;
   operating user inputs to signal the controller coupled to the DC voltage output to control the operation of the heating element to heat liquid contained in a container.

2. A beverage apparatus that is operable over a range of AC voltages, the beverage apparatus including:
   a power supply having an input receiving one of a first AC voltage source if the beverage apparatus is operated in a first area and receiving a second AC voltage source if the beverage apparatus is operated in a second area, wherein the first AC voltage source is different from the second AC voltage source, and the power supply having a DC voltage output of substantially a predetermined value regardless of whether the input is from the first AC voltage source or the second AC voltage source;
   a heating element coupled in parallel with the power supply to at least one of the first AC voltage and the second AC voltage;
   a controller coupled to the DC voltage output to receive power from the power supply, the controller being configured to control the operation of the heating element; and
   a switch coupled to the controller and coupled to the heating element, the controller opening and closing the switch to control heating of the liquid in the container, the first AC voltage being applied to the heating element when the switch is closed when the beverage heating apparatus is operated in the first area, and the second AC voltage being applied to the heating element when the switch is closed when the beverage heating apparatus is operated in the second area.

3. The beverage apparatus of claim 2, wherein the controller comprises a processor that controls the switch.

4. The beverage apparatus of claim 2, wherein the switch comprises a triac.

5. The beverage apparatus of claim 2, further comprising a solenoid to which the DC voltage output of the power supply is coupled.

6. The beverage apparatus of claim 5, wherein the solenoid is operable to dispense a beverage.

7. The beverage apparatus of claim 2, further comprising a valve to which the DC voltage output of the power supply is coupled.

8. The beverage apparatus of claim 7, wherein the valve is operable to dispense a beverage concentrate.

9. The beverage apparatus of claim 2, further comprising a pump to which the DC voltage output of the power supply is coupled.

10. The beverage apparatus of claim 9, wherein the pump is operable to move a beverage concentrate.

11. The beverage apparatus of claim 2, further comprising a sensor to which is coupled a signal derived from the DC voltage output of the power supply.

12. The beverage apparatus of claim 11, further comprising a pump having a rotatable shaft and the sensor senses a speed at which the shaft rotates.

13. The beverage apparatus of claim 11, the apparatus further comprising a heated water tank, the heating element being operatively associated with the heated water tank for heating water retained in the heated water tank, wherein the sensor senses a temperature of the heated element being operatively associated with the heated water tank for heating water retained in the tank wherein the sensor senses a temperature of the heated water.

14. The beverage apparatus of claim 11, further comprising a cooling cabinet and the sensor senses a temperature of a portion of the cooling cabinet.

15. The beverage apparatus of claim 11, further comprising a heat sink and the sensor senses a temperature of a portion of the heat sink.

16. The beverage apparatus of claim 11, wherein the sensor comprises a conductance sensor.

17. The beverage apparatus of claim 2, further comprising a fan to which the DC voltage output of the power supply is coupled.

18. The beverage apparatus of claim 17, further comprising a cooling cabinet that is cooled by the fan.

19. The beverage apparatus of claim 17, further comprising a heat sink that is cooled by the fan.

20. The beverage apparatus of claim 2, further comprising a motor to which the DC voltage output of the power supply is coupled.

21. The beverage apparatus of claim 2, further comprising a display to which the DC voltage output of the power supply is coupled.

22. The beverage apparatus of claim 2, further comprising a light to which the DC voltage output of the power supply is coupled.

23. The beverage apparatus of claim 2, further comprising an alarm to which the DC voltage output of the power supply is coupled.

24. The beverage apparatus of claim 2, further comprising an auxiliary power supply configured to convert the DC voltage output of the power supply to another power supply voltage.

25. A beverage heating apparatus that is operable either by a first AC voltage from a first source or by a second AC voltage from a second source, wherein the first source is different from the second source, the beverage heating apparatus comprising:

a container for retaining a liquid to be heated;

a power supply having an input receiving a first AC voltage when the beverage heating apparatus is operated a first area and receiving a second AC voltage when the beverage heating apparatus is operated in a second area, the power supply having a DC voltage output of substantially a predetermined value of about 24 volts DC regardless of whether the input is receiving the first AC voltage or the second AC voltage;

a heating element coupled in parallel with the power supply to at least one of the first AC voltage and the second AC voltage, the heating element being operable to heat the liquid retained in the container;

a controller coupled to the DC voltage output to receive power from the power supply, the controller being configured to control the operation of the heating element; and a switch coupled to the controller and coupled to the heating element, the controller opening and closing the switch to control heating of the liquid in the container, the first AC voltage being applied to the heating element when the switch is closed when the beverage heating apparatus is operated in the first area, and the second AC voltage being applied to the heating element when the switch is closed when the beverage heating apparatus is operated in the second area.

26. The beverage heating apparatus of claim 25, further comprising a temperature sensor that is coupled to the controller and that provides a signal to the controller which is indicative of a temperature of the liquid in the container.

27. The beverage heating apparatus of claim 25, further comprising a dispensing valve and a refill valve, the dispensing valve being coupled to the controller and openable to allow the liquid to flow out of the container, and the refill valve being coupled to the controller and openable to allow the container to be refilled automatically after a predetermined amount of liquid has been dispensed from the container.

\* \* \* \* \*